United States Patent [19]

Ueno et al.

[11] Patent Number: 4,639,768

[45] Date of Patent: Jan. 27, 1987

[54] VIDEO SIGNAL SUPERIMPOSING DEVICE

[75] Inventors: Atsushi Ueno; Takao Abumi, both of Yaita, Japan

[73] Assignee: Sharp Kabushiki Kaisha, Osaka, Japan

[21] Appl. No.: 656,757

[22] Filed: Oct. 1, 1984

[30] Foreign Application Priority Data

Oct. 3, 1983 [JP] Japan .................................. 58-185755

[51] Int. Cl.⁴ .............................................. H04N 9/74
[52] U.S. Cl. ........................................ 358/22; 358/30; 358/183; 340/721
[58] Field of Search .............................. 340/721–734, 340/745, 703, 814; 358/22, 19, 30, 183, 31

[56] References Cited

U.S. PATENT DOCUMENTS 4,161,748 7/1979 Heyl ........................................ 358/22
4,425,581 1/1984 Schweppe et al. .............. 358/183 X

FOREIGN PATENT DOCUMENTS 2132846 7/1984 United Kingdom ................... 358/12

OTHER PUBLICATIONS

Jackson and Tan, *System Concepts in High Fidelity Television*, IEE International Broadcasting Convention, Sep. 18-21, 1982, pp. 135-139.

NHK, *A Device for Superimposing Letters on TV Screen*, ABU Tech. Review, No. 23 (Japan), Nov. 1972, pp. 13-15.

Primary Examiner—James J. Groody
Assistant Examiner—Michael P. Dunnam
Attorney, Agent, or Firm—Birch, Stewart, Kolasch and Birch

[57] ABSTRACT

A video signal superimposing device for superimposing and clearly displaying video signals produced from at least two discrete systems includes an input terminal for inputting a color complex video signal, a separation circuit for separating a first brightness signal and a first chroma signal from the color complex video signal, a first generator for generating a second brightness signal, a first mixer circuit for mixing the second brightness signal and the first brightness signal separated by the separation circuit, a second generator for generating a second chroma signal, a second mixer circuit for mixing the second chroma signal and the first chroma signal separated by the separation circuit, and a third mixer circuit for mixing the mixed brightness signal applied from the first mixer circuit and the mixed chroma signal applied to the second mixer circuit.

9 Claims, 19 Drawing Figures

FIG.2(A)  ⓐ  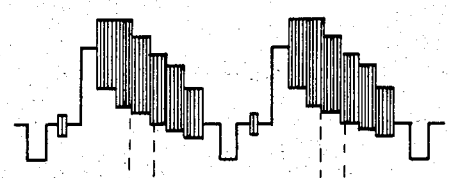
FIG.2(B)  ⓑ  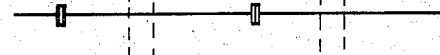
FIG.2(C)  ⓒ  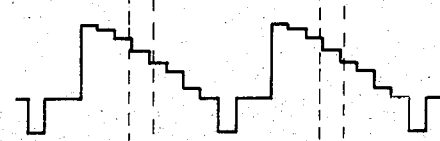
FIG.2(D)  ⓓ  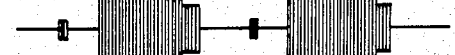
FIG.2(E)  ⓔ  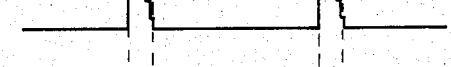
FIG.2(F)  ⓕ  
FIG.2(G)  ⓖ  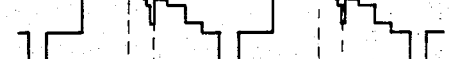
FIG.2(H)  ⓗ  
FIG.2(I)  ⓘ  

FIG. 4 (A) ⓐ' 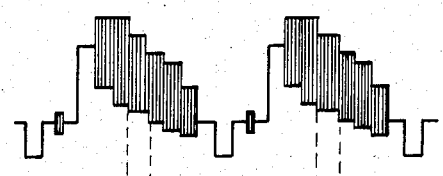
FIG. 4 (B) ⓑ' 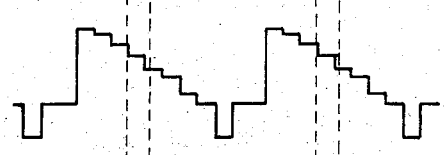
FIG. 4 (C) ⓒ' 
FIG. 4 (D) ⓓ' 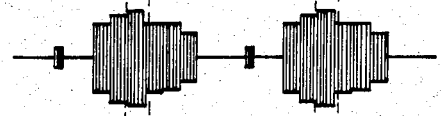
FIG. 4 (E) ⓔ' 
FIG. 4 (F) ⓕ' 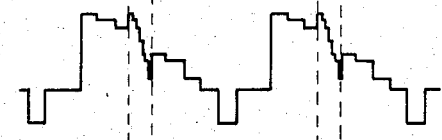
FIG. 4 (G) ⓖ' 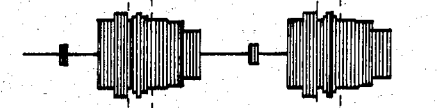
FIG. 4 (H) ⓗ' 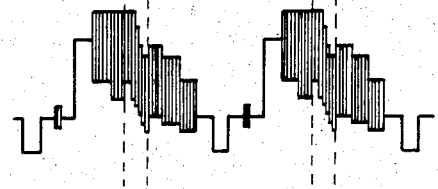

VIDEO SIGNAL SUPERIMPOSING DEVICE

BACKGROUND OF THE INVENTION

The present invention relates to a video signal superimposing device and, more particularly, to a device for superimposing and clearly displaying video signals produced from at least two discrete systems, e.g. a device for superimposing a personal computer data on a picture of a television broadcast.

Recently, personal computers have been increasingly used in homes, and it has been attempted to connect a household color television receiver with a personal computer as a CRT display unit to display the data supplied from the personal computer on the screen of the television.

New devices have been developed which superimpose the personal computer picture data on the television broadcast picture. However, the devices cannot make the superimposed computer picture data clear and also record the composite picture.

SUMMARY OF THE INVENTION

Accordingly, it is an object of the present invention to provide an improved superimposing device for superimposing and clearly displaying video signals produced from at least two discrete systems on a display screen.

It is another object of the present invention to provide an improved superimposing device for superimposing and clearly displaying video signals produced from at least two discrete systems on a display screen by using a single composite video signal combining the video signals.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a video signal superimposing device for superimposing and displaying video signals produced from at least two discrete systems comprises input means for inputting a color complex video signal, separation means for separating a first brightness signal and a first chroma signal from the color complex video signal, first generation means for generating a second brightness signal, first mixer means for mixing the second brightness signal and the first brightness signal separated by the separation means, second generation means for generating a second chroma signal, second mixer means for mixing the second chroma signal and the first chroma signal separated by the separation means, and third mixer means for mixing the mixed brightness signal applied from the first mixer means and the mixed chroma signal applied to the second mixer means.

The video signal superimposing device, further, comprises input means for inputting R.G.B. signals, in which the first and second generation means are operated to generate the second brightness signal and the second chroma signal based on the R.G.B. signals, respectively.

The two discrete systems for the superimposing device are a video imaging system such as a television, a video recorder, a video disc, or the like and a personal computer system.

According to another embodiment of the present invention, a video signal superimposing the device for superimposing display video signals from at least two discrete systems comprises input means for inputting a color complex video signal, separation means for separating a first brightness signal and a first chroma signal of the color complex video signal, first generation means for generating a second brightness signal, first mixer means for mixing the second brightness signal and the first brightness signal separated by the separation means, demodulation means for demodulating the first chroma signal separated by the separation means so as to form first R.G.B. signals, second generation means for generating second R.G.B. signals, second mixer means for mixing the second R.G.B. signals and the first R.G.B. signals produced from the demodulation means, respectively, third generation means for generating a second chroma signal based on the mixed R.G.B. signals, and third mixer means for mixing the mixed brightness signal and the second chroma signal. The video signal superimposing device, further, comprises gate means for separating a burst signal from the color complex video signal, fourth generation means for generating a color subcarrier signal based on the burst signal, in which the demodulation means is operated to demodulate the first chroma signal based on the color subcarrier signal, and the third generation means is operated to generate the second chroma signal based on the color subcarrier signal.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 2(A)–2(I) show signal waveforms for explaining the operation of the superimposing device of FIG. 1;

FIGS. 4(A)–4(H) show signal waveforms for explaining the operation of the superimposing device according to another embodiment of the present invention.

DETAILED DESCRIPTION OF THE INVENTION

Figure 1:
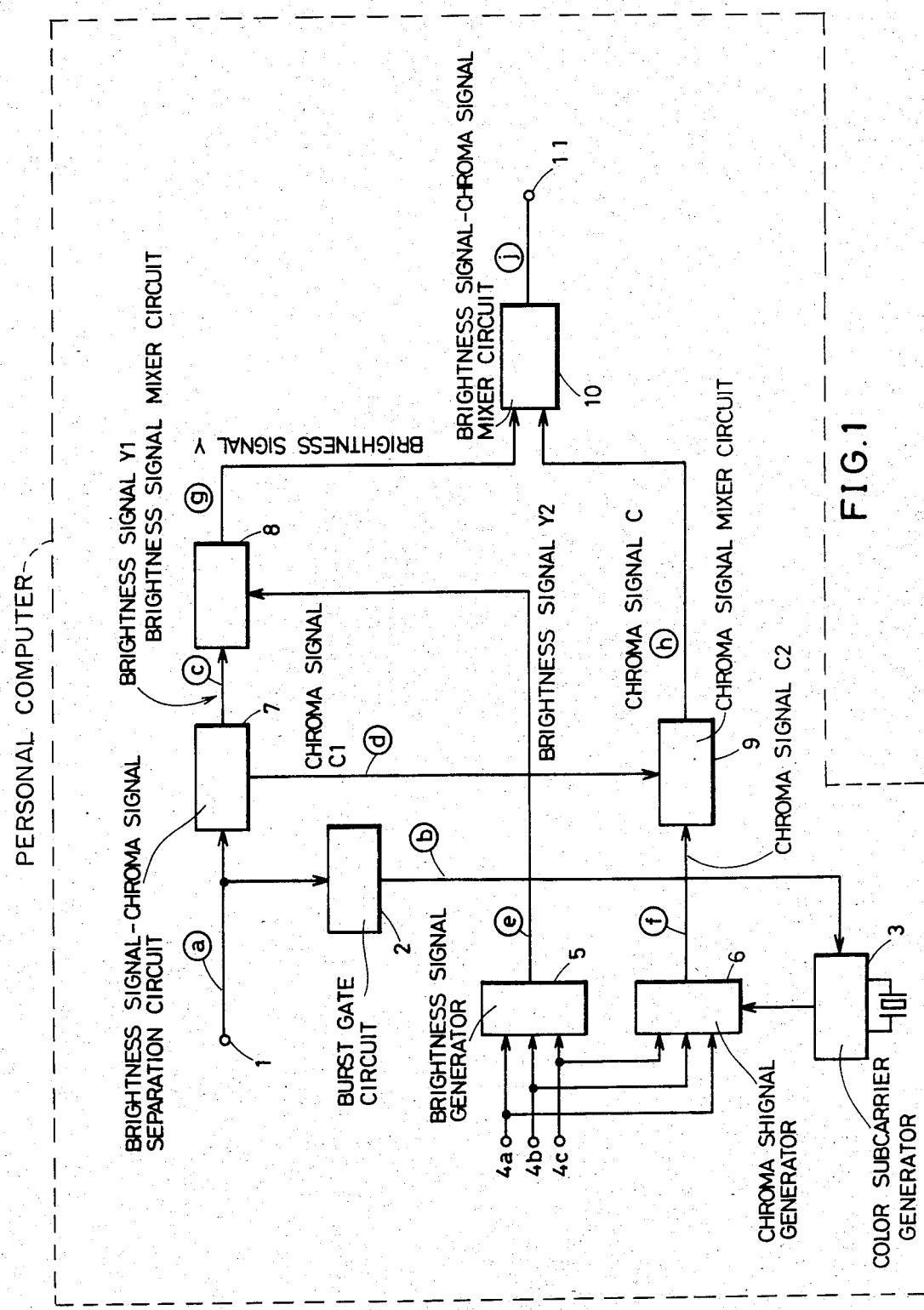
FIG. 1 shows a block diagram of a superimposing device according to an embodiment of the present invention.

FIG. 1 shows a block diagram of a video signal superimposing device according to an embodiment of the present invention.

A color complex video signal produced by each of a television, a video recorder, a video disc, or the like is inputted into a video signal input terminal 1. The color complex video signal is applied to a burst gate circuit 2 and a brightness signalchroma signal separation circuit 7. The burst gate circuit 2 separates a burst signal component from the inputted color complex video signal. The burst signal is applied to a color subcarrier generator 3, and the color subcarrier generator 3 generates a color subcarrier signal of 3.58 MHz based on the burst signal separated by the burst gate circuit 2. The color subcarrier signal of 3.58 MHz is applied to a chroma signal generator 6.

R.G.B. signals (Red, Green, Blue signals) such as signals for data formed by a personal computer, or the like are inputted into R.G.B. signal input terminals 4a, 4b, and 4c, respectively. The R.G.B. signals inputted into the R.G.B. signal input terminals 4a, 4b, and 4c are applied to a brightness signal generator 5 and the chroma signal generator 6. The brightness signal generator 5 outputs a brightness signal Y2 based on the R.G.B. signals, and the brightness signal Y2 is applied to a brightness signal mixer circuit 8. The chroma signal generator 6 outputs a chroma signal C2 based on the R.G.B. signals inputted from the R.G.B. signal input terminals 4a, 4b, and 4c and the color subcarrier signal generated by the color subcarrier generator 3, and the chroma signal C2 is applied to a chroma signal mixer circuit 9.

The color complex video signal applied to the brightness signal-chroma signal separation circuit 7 is separated into a brightness signal Y1 and a chroma signal C1 by the brightness signal-chroma signal separation circuit 7. The brightness signal Y1 output by the brightness signal-chroma signal separation circuit 7 is applied to the brightness signal mixer circuit 8. The brightness signal mixer circuit 8 mixes the brightness signal Y1 separated by the brightness signal-chroma signal separation circuit 7 and the brightness signal Y2 produced by the brightness signal generator 5, and the mixed brightness signal Y is applied to a brightness signal-chroma signal mixer circuit 10.

The chroma signal mixer circuit 9 mixes the chroma signal C1 separated by the brightness signal-chroma signal separation circuit 7 and the chroma signal C2 generated by the chroma signal generator 6, and the mixed chroma signal C is applied to the brightness signal-chroma signal mixer circuit 10. The brightness signal-chroma signal mixer circuit 10 mixes the brightness signal Y produced by the brightness signal mixer circuit 8 and the chroma signal C produced by the chroma signal mixer circuit 9 so as to form a color composite video signal for superimposing and clearly displaying two video signals produced from two discrete systems on a display means.

The output of the brightness-chroma signal mixer circuit 10 is applied to the display means through a video signal output terminal 11, so that two video signals produced by the different systems are superimposed and clearly displayed on the display means.

The operation of the video signal superimposing device comprising above circuit will be described below with reference to FIGS. 2(A)-2(I).

If the color complex video signal is applied from a color television receiver and the R.G.B. signals are applied from the other apparatus such as the personal computer, the color complex video signal as shown in FIG. 2(A) is applied to the signal input terminal 1, and the R.G.B. signals are applied to the R.G.B. signal terminals 4a, 4b, and 4c, respectively. The color complex video signal is inputted into the burst gate circuit 2 and the brightness signal-chroma signal separation circuit 7. The burst gate circuit 2 separates and outputs the burst signal component as shown in FIG. 2(B) from the color composite video signal so as to introduce it into the color subcarrier generator 3. On the other hand, the brightness signal-chroma signal separation circuit 7 separates and outputs the brightness signal Y1 as shown in FIG. 2(C) and the chroma signal C1 as shown in FIG. 2(D). The brightness signal Y1 outputted from the brightness signal-chroma signal separation circuit 7 is introduced into the brightness mixer circuit 8. The chroma signal C1 outputted from the brightness-chroma signal separation circuit 7 is introduced into the chroma signal mixer circuit 9.

In this time, the color subcarrier generator 3 generates continuously the color subcarrier signal of 3.58 MHz based on the burst signal inputted from the burst gate circuit 2. The color subcarrier signal of 3.58 MHz corresponds with a frequency and a phase of the burst signal from the burst gate circuit 2. The color subcarrier signal is applied to the chroma signal generator 6.

In response to the color subcarrier signal, the chroma signal C2 as shown in FIG. 2(F) is formed by the chroma signal generator 6 based on the R.G.B. signals applied via the R.G.B. signal input terminals 4a, 4b, 4c, and is applied to the chroma signal mixer circuit 9. The brightness signal generator 5 mixes the R.G.B. signals applied via the R.G.B. signal input terminals 4a, 4b, and 4c by a ratio of Red signal:Green signal:Blue signal=0.31:0.59:0.11 so as to form the brightness signal C2 as shown in FIG. 2(E). The brightness signal-chroma signal mixer circuit 8 mixes two type brightness signals Y1 and Y2 applied from the brightness signal-chroma signal separation circuit 7 and the brightness signal generator 5, so that the mixed or composite brightness signal Y as shown in FIG. 2(G) produced by the brightness signal mixer circuit 8 is outputted into the brightness signal-chroma signal mixer circuit 10.

The chroma signal mixer circuit 9 mixes two type chroma signals C1 and C2 outputted from the brightness signal-chroma signal separation circuit 7 and the chroma signal generator 6, so that the mixed or composite chroma signal C is produced as shown in FIG. 2(H) and is applied to the brightness-chroma signal mixer circuit 10, also. The composite brightness signal Y and the composite chroma signal C are mixed by the brightness signal-chroma signal mixer circuit 10, and a single color composite video signal as shown in FIG. 2(I) for superimposing and clearly displaying one video signal on the other video signal is produced by the brightness-chroma signal mixer circuit 10, and the single color composite video signal is applied to the display means via the output terminal 11.

According to the embodiment of the present invention, the color complex video signal applied to the input terminal 1 is separated into the brightness signal component and the chroma signal component. The brightness signal component and the chroma signal component are mixed with the brightness signal and the chroma signal applied from the other system, respectively, and thereafter, the composite brightness signal and the composite chroma signal are further mixed so as to eventually output a single color composite video signal superimposing and clearly displaying two discrete system video signals.

As described above, in the video signal superimposing device of the embodiment of the present invention, after the color complex video signal is separated into the brightness signal component and the chroma signal component, and after the brightness signals and the chroma signals produced from the two discrete systems are individually mixed, the composite brightness signal and the composite chroma signal are further mixed so as to form the single color composite video signal for superimposing and clearly displaying the two type video signals, so that the brightness signal and the chroma signal rarely interfere mutually as compared with the conventional interference between the brightness signal and the chroma signal when two system color complex video signals are directly mixed. Accordingly, when the video signals produced from the two discrete systems are superimposed and displayed on the screen of the display means by using the single composite video signal outputted from the video signal superimposing device of the present invention, the colors are not crossed and mixed.

Figure 3:
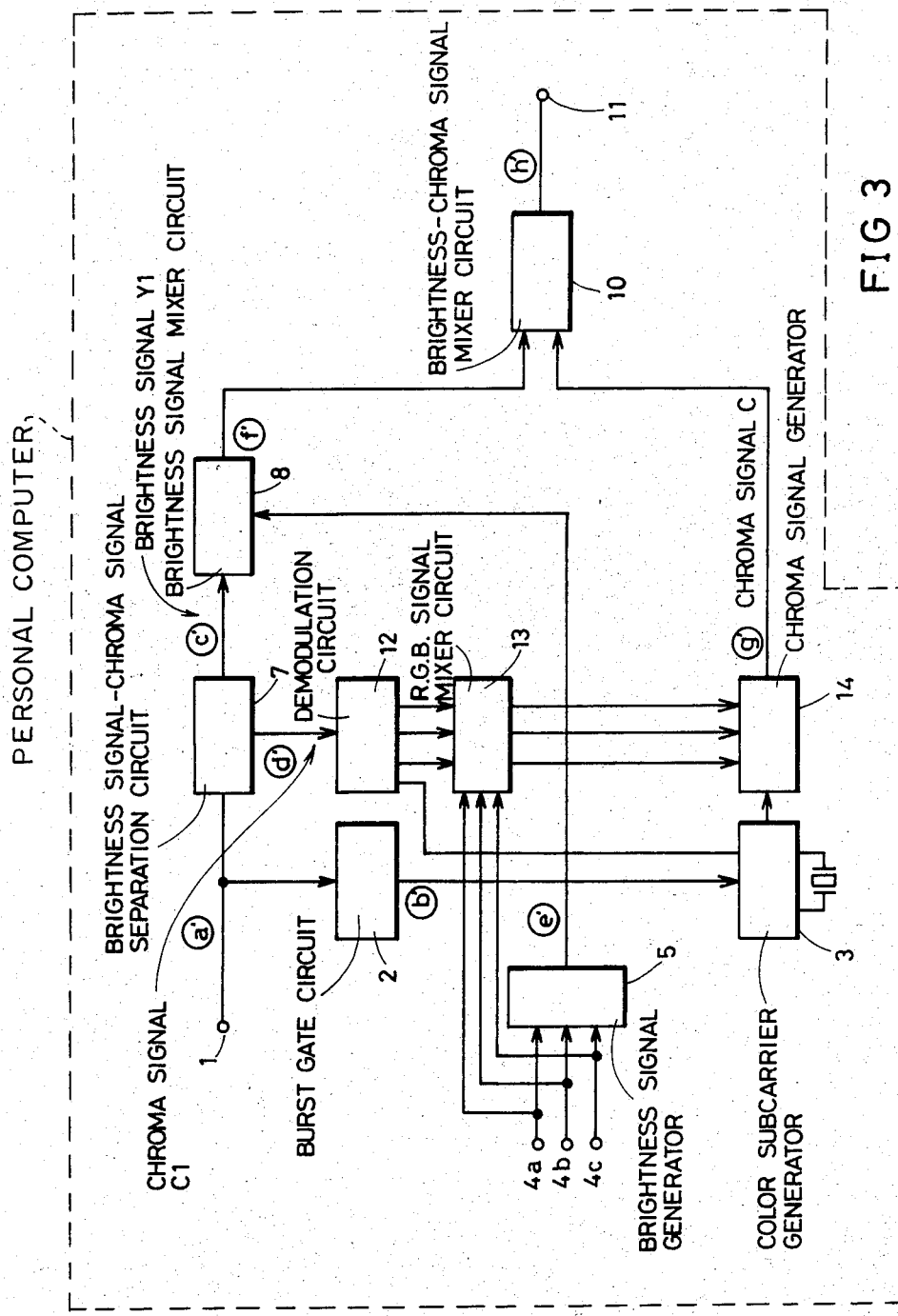
FIG. 3 shows a block diagram of a superimposing device according to another embodiment of the present invention.

FIG. 3 shows a circuit diagram of a video signal superimposing device according to another embodiment of the present invention.

Like elements corresponding to the parts of FIG. 1 are denoted by like reference characters in FIG. 3.

With an exception and addition to FIG. 1, the circuit of FIG. 3 includes, a demodulation circuit 12 that is provided for demodulating the chroma signal C1 separated by the brightness signal-chroma signal separation circuit 7 based on the color subcarrier signal produced from the color subcarrier generator 3 so as to produce R.G.B. signals. A R.G.B. signal mixer circuit 13 mixes individually the R.G.B. signals produced by the demodulation circuit 12 and the R.G.B. signals introduced via the input terminals 4a, 4b, and 4c, respectively. A chroma signal generator 14 forms the chroma signal C based on the mixed R.G.B signals produced by the R.G.B. signal mixer circuit 13 and the color subcarrier signal generating from the color subcarrier signal generator 3.

According to another embodiment of the present invention, if the color complex video signal is applied to the input terminal 1 from the color television receiver and the R.G.B signals are applied to the R.G.B. signal input terminals 4a, 4b, 4c from the other apparatus such as the personal computer, the color complex video signal as shown in FIG. 4(A) is applied to the signal input terminal 1, and the R.G.B. signals are applied to the R.G.B. signal terminals 4a, 4b, and 4c, respectively. The color complex video signal is inputted into the burst gate circuit 2 and the brightness signal-chroma separation circuit 7. The burst gate circuit 2 separates and outputs the burst signal as shown in FIG. 4(B) so as to introduce it into the color subcarrier generator 3. On the other hand, the brightness signal-chroma signal separation circuit 7 separates and outputs the brightness signal Y1 as shown in FIG. 4(C) and the chroma signal C1 as shown in FIG. 4(D). The brightness signal Y1 outputted from the brightness-chroma signal separation circuit 7 is introduced into the brightness mixer circuit 8. The chroma signal C1 outputted from the brightness-chroma signal separation circuit 7 is introduced into the demodulation circuit 12.

In this time, the brightness signal generator 5 mixes the R.G.B. signals applied from the R.G.B signal input terminals 4a, 4b, and 4c based on a ratio of Red signal:-Green signal:Blue signal=0.31:0.59:0.11 so as to form the brightness signal Y2 as shown in FIG. 4(E). The brightness signal Y2 is inputted into the brightness signal mixer circuit 8. The brightness signal mixer circuit 8 mixes two type brightness signals Y1 and Y2 produced from the brightness signal-chroma signal separation circuit 7 and the brightness generator 5 so as to form a composite brightness signal Y as shown in FIG. 4(F).

On the other hand, the color subcarrier generator 3 generates continuously the color subcarrier signal of 3.58 MHz in response to the burst signal inputted from the burst gate circuit 2. The color subcarrier signal of 3.58 MHz corresponds with a frequency and a phase of the burst signal from the burst gate circuit 2. The color subcarrier signal is applied to the demodulation circuit 12 and the chroma signal generator 14.

The demodulation circuit 12 demodulates the chroma signal separated by the brightness signal-chroma signal separation circuit 7 based on the color subcarrier signal produced from the color subcarrier generator 3 so as to produce the R.G.B. signals. The R.G.B. signals produced by the demodulation circuit 12 are applied to the R.G.B. signal mixer circuit 13. The R.G.B. signal mixer circuit 13 mixes the R.G.B. signals inputted from the demodulation circuit 12 and the R.G.B. signals inputted from the R.G.B. signal input terminals 4a, 4b, and 4c, respectively. The addition-composite R.G.B. signals outputted from the R.G.B. signal mixer circuit 13 are applied to the chroma signal generator 14. The chroma signal generator 14 produces the chroma signal C as shown in FIG. 4(G) based on the color subcarrier signal and the addition-composite R.G.B. signals, and the chroma signal C is introduced into the brightness-chroma mixer circuit 10, and the brightness signal-chroma signal mixer circuit 10 mixes the brightness signal Y produced from the brightness signal mixer circuit 8 and the chroma signal C produced from the chroma signal generator 14, so that a single color composite video signal as shown in FIG. 3(H) for superimposing and clearly displaying one video signal along with the other video signal on the screen of the display means is generated and introduced into the video output terminal 11.

According to said another embodiment of the present invention, the color complex signal applied to the input terminal 1 is separated into the brightness signal component and the chroma signal component, and the chroma signal is demodulated by the demodulation circuit so as to produce the R.G.B. signals. The brightness signal component and the R.G.B. signals are mixed with the brightness signal component and the R.G.B. signals applied from the other system, respectively, and thereafter, the addition-composite R.G.B. signals are mixed and transformed into the chroma signal, and the brightness signal and the chroma signal are further mixed so as to produce a single color composite video signal for superimposing and clearly displaying one video signal on the other video signal. The color composite video signal for superimposing two video signals is applied to the display means through the output terminal 11.

As described above, in the video signal superimposing device of another embodiment of the present invention, the color complex video signal is separated into the brightness signal component and the chroma signal component, and the chroma signal component is demodulated so as to produce the R.G.B. signals. The brightness signal and the R.G.B. signals are then mixed with the brightness signal and the R.G.B. signals from the other system, respectively, and the mixed R.G.B. signals are transformed into the chroma signal, and thereafter, the brightness signal and the chroma signal are further mixed, so that the single color composite video signal for superimposing and clearly displaying the video signals from the two different systems is produced.

For example, the color complex video signal inputted into the terminal 1 may be produced by a television, a video recorder, a video disc, a laser disc, or the like. The R.G.B. signals inputted into the R.G.B. signal input terminals may be produced by a personal computer, or the like.

The video signal superimposing device according to the present invention may be included into a personal computer, a video imaging device such as a television, a video recorder, a video disc, or the like, and the video signal superimposing device may be provided separately.

According to the present invention, the number of systems producing the video signals should be limited to two as described above.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A video signal superimposing device for superimposing and displaying video signals produced from at least two systems comprising:
    first input means for inputting a color complex video signal;
    means for producing a burst signal from said color complex video signal;
    separation means for separating a first brightness signal and a first chroma signal from the color complex video signal;
    second input means for inputting R.G.B. signals;
    first generation means for generating a second brightness signal from said R.G.B. signals;
    first mixer means for mixing the second brightness signal and the first brightness signal separated by the separation means to form a mixed brightness signal;
    second generation means responsive to said burst signal for generating a second chroma signal from said R.G.B. signals;
    second mixer means for mixing the second chroma signal and the first chroma signal separated by the separation means to form a mixed chroma signal; and
    third mixer means for mixing the mixed brightness signal applied from the first mixer means and the mixed chroma signal applied to the second mixer means to form a combined signal.

2. The video signal superimposing device of claim 1, wherein the two systems are a video imaging system and a personal computer system.

3. The video signal superimposing device of claim 2, wherein the video imaging system is a television, a video recorder, or a video disc.

4. The video signal superimposing device of claim 1, wherein the superimposing device is built into a personal computer.

5. The video signal superimposing device of claim 1, wherein the video signal superimposing device is built into a video imaging system.

6. A video signal superimposing device for superimposing and displaying video signals from at least two systems comprising:
    input means for inputting a color complex video signal;
    separation means for separating a first brightness signal component and a first chroma signal component from the color complex video signal;
    second input means for inputting first R.G.B. signals;
    first generation means for generating a second brightness signal from said first R.G.B. signals;
    first mixer means for mixing the second brightness signal and the first brightness signal separated by the separation means to form a mixed brightness signal;
    demodulation means for demodulating the first chroma signal separated by the separation means so as to form second R.G.B. signals;
    second mixer means for mixing the first R.G.B. signals and the second R.G.B. signals produced from the demodulation means, respectively to form a mixed R.G.B. signal;
    second generation means for generating a second chroma signal based on the mixed R.G.B. signal; and
    third mixer means for mixing the mixed brightness signal and the second chroma signal to form a combined signal.

7. The video signal superimposing device of claim 6, further comprising:
    gate means for separating a burst signal component from the color complex video signal;
    third generation means for generating a color subcarrier signal based on the burst signal, in which the demodulation means is operated to demodulate the first chroma signal based on the color subcarrier signal, and the second generation means is operated to generate the second chroma signal based on the color subcarrier signal.

8. A method for superimposing a second signal onto a first signal to produce a combined video signal comprising the steps of:
    inputting a color complex video signal as the first signal;
    producing a burst signal from said color complex video signal;
    separating said color complex video signal into a first chroma signal and a first brightness signal;
    inputting R.G.B. signals as the second signal;
    producing a second brightness signal from said R.G.B. signals;
    producing a subcarrier signal from said burst signal;
    producing a second chroma signal from said R.G.B. signals using said subcarrier signal;
    combining said first and second chroma signals to form a mixed chroma signal;
    combining said first and second brightness signals to form a mixed brightness signal; and
    combining said mixed chroma signal and said mixed brightness signal to form the combined video signal.

9. A method for superimposing a second signal onto a first signal to produce a combined video signal comprising the steps of:
    inputting a color complex video signal as the first signal;
    separating said color complex video signal into a first chroma signal and a first brightness signal;
    inputting first R.G.B. signals as the second signal;
    producing a second brightness signal from said first R.G.B. signals;
    combining said first and second brightness signals to form a mixed brightness signal;
    demodulating said first chroma signal to produce second R.G.B. signals;
    combining said first and second R.G.B. signals to produce a mixed R.G.B. signal;
    producing a burst signal from said color complex video signal;
    producing a subcarrier signal from said burst signal;
    producing a mixed chroma signal from said mixed R.G.B. signal using said subcarrier signal;
    combining said chroma signal and said mixed brightness signal to form the combined video signal.

* * * * *